Patented Nov. 17, 1942

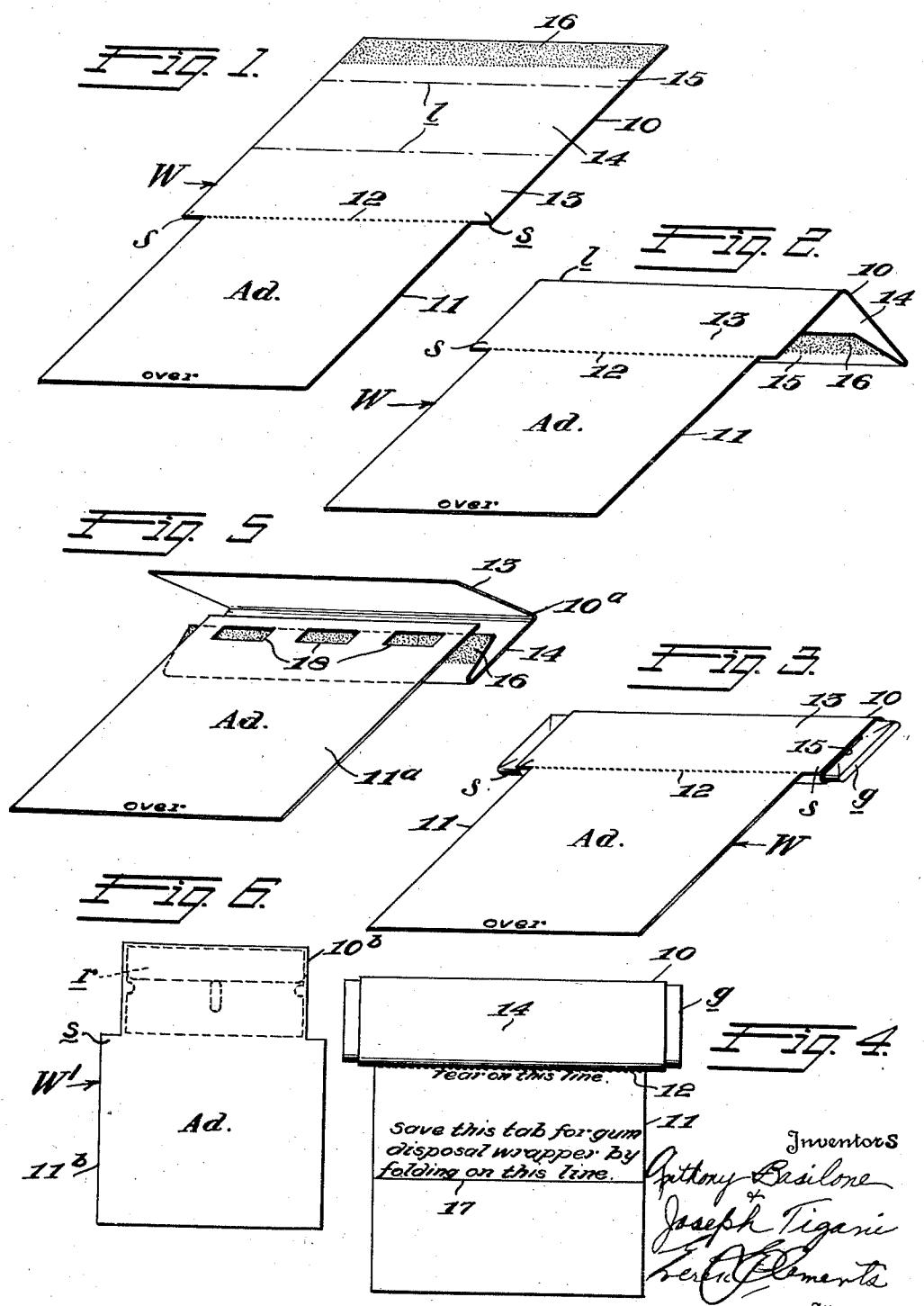

2,301,997

UNITED STATES PATENT OFFICE 2,301,997

ADVERTISING MERCHANDISING WRAPPER

Anthony Basilone and Joseph Tigani, New York, N. Y., assignors to Nu-Way Advertising Company, New York, N. Y.

Application September 9, 1940, Serial No. 356,088

1 Claim. (Cl. 229—87)

This invention relates to an advertising merchandising wrapper.

More particularly the invention pertains to a wrapper of novel construction embodying a portion for enclosing a token or article of merchandise, and a portion in the form of a tab in projecting relation to the token enclosing portion for bearing advertising matter.

As is generally known, advertising to a large extent, governs the volume of any particular business, and while such advertising may be of different forms, such, for example, recommendations by satisfied customers, nevertheless, most forms consist of printed matter which may appear in magazines, etc., or in the form of circulars for distribution among the general public.

The general public give little attention to advertising matter unless it should relate to something in which they may per chance be particularly interested, and in the case of advertising circulars they usually do not accept them or immediately dispose of them without reading the printed matter which they bear.

It is however, an easy matter to induce the general public to accept an article which has same material value and if advertising matter accompany such article, the receiver in his interest in the article is quite apt to read the advertising matter.

Thus, the improved form of wrapper according to this invention is adapted for enclosing a token or an article of merchandise for distribution, as well as advertising matter, the token or article providing an incentive to read the advertising matter.

While it may be expensive advertising for any particular business concern to manufacture tokens adapted for distribution in the improved wrappers, such wrappers do in effect provide an economical mode of advertising as well as a convenient means of distributing a product for the reason that a manufacturer of chewing gum, razor blades, and the like may modify the wrappers for same in conformity with the present invention and provide the tabs thereof with advertising for any particular business or firm.

The improved wrappers, even with advertising matter thereon would be little more expensive than the usual wrappers and any business concern or firm would obtain relatively low rates of advertising upon paying the manufacturer of the token or article of merchandise the price which they would ordinarily receive for their products, or even a little more, and in this way, the public would receive the token or article of merchandise as a gift.

Thus with the improved advertising merchandise wrapper, a business concern or firm would receive low rate advertising, the manufacturer would secure full value of his product and by presentation of the product to the public with the attached advertising, it would be gladly received with substantial assurance that the advertising would be read.

Thus the improved wrapper will provide an economical mode of advertising as well as a convenient distribution of a product in greater volume than could be attained otherwise.

A primary object of the invention is the provision of an advertising merchandising wrapper for economical advertising as well as stimulating the distribution of a product.

A further object of the invention is the provision of a wrapper including a portion for enclosing a token or article of merchandise and a portion, in the form of a tab for bearing advertising matter.

A further object is to provide a combined token or article enclosing wrapper and advertising leaflet or tab in which the wrapper is complete and apart from the leaflet which latter is detachably united thereto for ready separation therefrom without exposing or otherwise destroying the freshness or stability of the enclosed article.

A still further object of the invention is the provision of a wrapper including a portion for enclosing a stick of chewing gum and a detachable tab for advertising matter as well as for disposal of the used gum.

Additional objects and advantages of the invention will become obvious in the course of the following detailed description, taken in connection with the accompanying drawing wherein—

Fig. 1 is a perspective view of the improved wrapper in accordance with a preferred embodiment of the invention.

Fig. 2 is a similar view with the wrapper in partially closed position.

Fig. 3 is a similar view showing a token or article of merchandise enclosed in the wrapper.

Fig. 4 is a rear plan view of the structure according to Fig. 3.

Fig. 5 is a perspective view of a modified form of wrapper, and

Fig. 6 is a plan view of a still further modified form of wrapper.

Referring now in detail to the drawing by the use of reference numerals, W designates the improved wrapper in its entirety. The wrapper W includes a token or article enclosing portion or envelope 10 and a portion 11 in the form of a tab or leaflet for receiving advertising matter, such portion having the indicia "Ad." on the drawing. The tab 11 is preferably narrower than the portion 10 for noticeably setting the advertising tab off from the wrapped token or article as can be more fully appreciated from Figs. 3 and 4 and the wrapper W is preferably perforated at the junction of the tab 11 with the portion 10 as indicated at 12 to facilitate separation. The article enclosing portion 10 is adapted for folding on the dot-and-dash lines *l* which in effect define flaps 13, 14 and 15 and the end edge of flap 15 is gummed for a purpose later referred to.

The portion 10 of the wrapper W is adapted to enclose a token or article of merchandise such as a stick of chewing gum *g* for which purpose said portion is folded on lines *l* as indicated in Fig. 2 with the flap 13 remaining substantially plane with the tab 11, the flap 14 engaged with the bottom side of the stick of gum and the flap 15 engaged beneath flap 13, flaps 13 and 15 both engaging the top side of the stick of gum as indicated in Fig. 3. The stick of gum is adapted to be inserted during the folding of the flaps whereupon flaps 13 and 15 are adhesively secured upon moistening the gummed strip 15.

The tab 11 may bear advertising for any business as may be contracted for with the manufacturer of the gum and the package consisting of the stick of gum and advertising tab is ready for distribution in the form represented in Figs. 3 and 4.

While many articles of merchandise other than chewing gum may be distributed in the improved wrapper by suitable modification of the portion 10, it is particularly suited for the distribution of gum whereby the tab 11 not only serves for advertising but also forms a convenient receptacle for the used gum for the disposal thereof. It is particularly for this purpose that the wrapper is perforated at 12 for ready detachment of the tab.

The tab 11 bears the word "over" at the bottom thereof and the back of the tab bears the indicia "tear on this line" immediately under the perforated line 12. The tab is also provided with a line 17 on the back thereof and midway of the top and bottom edges thereof, and the back of the tab bears the indicia "save this tab for gum disposal wrapper by folding on this line."

While it has been pointed out above that the tab or leaflet portion of the blank which forms the combined article wrapping envelope and advertising means, is preferably of less width than the wrapper portion of the blank, it will be seen that a shoulder *s* is thus provided at each side of the blank. These shoulders are for the purpose of facilitating proper alignment of the remote gummed end portion of the blank when turned upon itself over the article or token and secured to provide the article enclosing envelope. Further the positioning of the shoulders *s* limit the securing of the wrapper portions sufficiently beyond the perforated line 12 so that the tab or leaflet portion 11 may be readily detached and retained by the person receiving the token without exposing or otherwise destroying the freshness or stability of the article contained within the wrapper.

Thus it will be appreciated that the tab 11 not only fulfills its use as an advertising medium but it also serves as a convenient wrapper for the disposal of the used gum.

While it is preferred to construct the tab 11 integral with the article wrapping portion 10, the tab 11a may be constructed separate from the article enclosing portion 10a as indicated in Fig. 5.

With this modified construction the upper edge of the tab 11a is provided with a plurality of apertures or cut-out portions 18 and the upper edge of the tab is adapted to coincide with the free edge of the flap 15 whereupon the adhesive 16 will contact the bottom of the tab as well as the bottom of the flap 13 through the apertures 18 thereby firmly uniting the flaps 13 and 15 and the advertising tab 11a.

A modified wrapper W' is illustrated in Fig. 6 wherein the article enclosing portion 10b is of a size to accommodate a razor blade *r* and the advertising tab 11b is wider than the portion 10b for effect as well as for bearing a substantial volume of advertising matter.

While the article enclosing portion and advertising tab may partake of various sizes and forms according to the invention, the pre-requisites thereof, are that the improved advertising merchandise wrapper provides means for enclosing a token or article of merchandise and means for receiving advertising in connection therewith whereby the improved wrapper in use will provide an economical mode of advertising as well as stimulating the distributing of an article of merchandise.

While we have disclosed certain specific embodiments of our invention, such are to be considered as illustrative only, and not restrictive, the scope of the invention being defined in the sub-joined claim.

What we claim and desire to secure by U. S. Letters Patent is:

A package including an elongated flat stick of gum and a substantially rectangular enclosing sheet for the stick, said sheet having parallel fold lines thereacross defining two similar intermediate panels for embracing opposite sides of said stick, a third panel at one end of the sheet having an adhesive band on its outer face and being foldable between said stick and one of said intermediate panels for adhesion thereto, and a fourth tab-like panel integral with the opposite end of said sheet and projecting therebeyond and laterally from the package thus formed, whereby to provide a separable advertising medium usable in disposal of the contents of the package.

ANTHONY BASILONE.
JOSEPH TIGANI.